United States Patent
Jung

(10) Patent No.: US 6,655,669 B1
(45) Date of Patent: Dec. 2, 2003

(54) HYDRAULIC STRUT MOUNTING ASSEMBLY

(75) Inventor: Si-Seob Jung, Suwon-Shi (KR)

(73) Assignee: Kia Motors Corporation, Seoul (KR)

( * ) Notice: Subject to any disclaimer, the term of this patent is extended or adjusted under 35 U.S.C. 154(b) by 0 days.

(21) Appl. No.: 10/215,557

(22) Filed: Aug. 8, 2002

(30) Foreign Application Priority Data

May 15, 2002 (KR) .......................................... 2002-26830

(51) Int. Cl.[7] ................................................. F16F 9/08
(52) U.S. Cl. ....................................... 267/220; 267/219
(58) Field of Search ................................. 267/219, 220, 267/33, 35, 140.13

(56) References Cited

U.S. PATENT DOCUMENTS 5,330,166 A * 7/1994 Aoki .......................... 267/220
5,474,284 A * 12/1995 Hamaekers et al. ......... 267/220
5,487,535 A * 1/1996 Carter et al. ................ 267/220
5,595,374 A * 1/1997 Charette et al. ............ 267/220

* cited by examiner

Primary Examiner—Christopher P. Schwartz
(74) Attorney, Agent, or Firm—Pennie & Edmonds LLP

(57) ABSTRACT

Disclosed is a hydraulic strut mounting assembly including a plurality of chambers formed within a strut mount, in which the chambers are communicated with each other and are filled with hydraulic fluid for supplying a hydraulic pressure, thereby reinforcing capability of a shock absorber and a coil spring and thus further improving a ride quality of a vehicle. The hydraulic strut mounting assembly comprises a strut mount coupled to a shock absorber, a decoupler provided across an interior space of the strut mount, an upper and lower chamber formed in the strut mount by the decoupler, an orifice communicating the upper chamber with the lower chamber, a fluid filled within the lower chamber, and a plunger for pressurizing the fluid in line with the shock absorber when a vibration is generated.

8 Claims, 2 Drawing Sheets

HYDRAULIC STRUT MOUNTING ASSEMBLY

FIELD OF THE INVENTION

The present invention relates to a strut mounting assembly for a suspension, and more particularly, to a hydraulic strut mounting assembly including a plurality of chambers formed in the strut mount, and filled with hydraulic fluid to provide hydraulic dampening.

BACKGROUND OF THE INVENTION

A suspension generally connects a wheel axle with a vehicle body, so that the vibration or impact applied to the wheel axle from a road surface is absorbed by the suspension to prevent it from being directly transferred to the vehicle body, thereby protecting the vehicle body or freight and improving the ride quality. Such a suspension typically includes a coil spring for damping the impact shock from the road surface, and a shock absorber for suppressing vibration of the coil spring to improve the ride quality.

In general, suspensions are classified into front suspensions and rear suspensions depending upon a mounting location of the suspension. The front suspension supports the weight of the vehicle by connecting the vehicle frame with the vehicle axle, as well as absorbing the vibration transferred from the wheel.

The most common form of the front suspension is a strut-type or Macpherson-type suspension where a shock absorber is mounted onto a strut. In this type, an upper end of the strut is fixed to a strut mount, while a lower end is connected to a steering knuckle.

In conventional strut mount assemblies, upon collision or rebound, the vibration transferred from the steering knuckle is primarily absorbed by the coil spring. Then, the vibration conveyed through the coil spring is transferred to the shock absorber. The vibration is further absorbed by a damping means provided in the strut mount and is dispersed to the vehicle frame.

Such conventional strut mount assemblies, however, may provide insufficient dampening on rough road surfaces creating strong vibrations. There therefore exists a need for improved dampening capability on a strut assembly.

SUMMARY OF THE INVENTION

In a preferred embodiment, the present invention provides a hydraulic strut mounting assembly comprising a strut mount coupled to a shock absorber, a decoupler provided across an interior space of the strut mount, upper and lower chambers formed in the strut mount by the decoupler, an orifice communicating between the upper chamber and the lower chamber, a fluid filled within the lower chamber, and a plunger for pressurizing the fluid in line with the shock absorber when a vibration is generated.

Preferably, the strut mount includes a bracket detachably coupled to an upper portion thereof for isolating an interior of the strut mount from the exterior, and a mounting rubber provided in a lower portion thereof for absorbing and dispersing a vibration of the shock absorber. Preferably, the strut mount is hermetically sealed by the bracket and mounting rubber. In a further preferred alternative embodiment, the plunger is coupled to the shock absorber via fastening means, preferably a female threaded structure or press-fitted structure, and the plunger is positioned in the lower chamber. The fluid preferably flows from the lower chamber to the upper chamber due to action of the plunger when vibration exceeding an amplitude range of ±1.0 mm occurs.

It is to be understood that both the foregoing general description and the following detailed description of the present invention are exemplary and explanatory and are intended to provide further explanation of the present invention as claimed.

BRIEF DESCRIPTION OF THE DRAWINGS

The accompanying drawings, which are included to provide a further understanding of the present invention and are incorporated in and constitute a part of this application, illustrate embodiment(s) of the present invention and together with the description serve to explain the principle of the present invention. In the drawings.

DETAILED DESCRIPTION OF THE PREFERRED EMBODIMENTS

Figure 1:
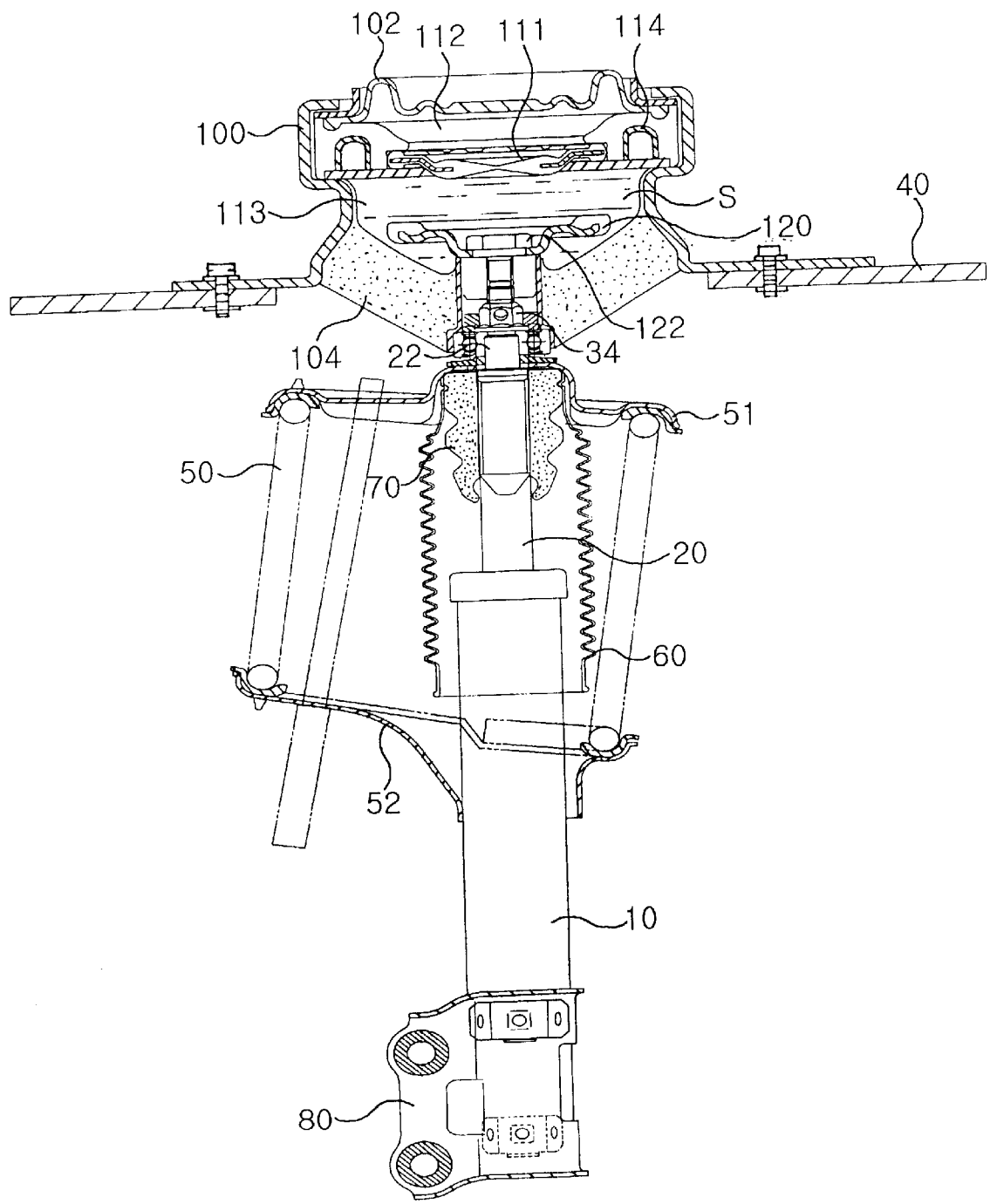
FIG. 1 is a cross sectional view illustrating the construction of a hydraulic strut mount assembly according to a preferred embodiment of the preset invention.

In general, as shown in FIG. 1, a hydraulic strut mount assembly according to an embodiment of the present invention includes a shock absorber 20 connected to the upper portion of a strut 10, and a strut mount 100, to which the upper end of the shock absorber 20 is fastened by a nut 34 fixed to vehicle frame 40. The lower portion of the strut 10 is secured to a steering knuckle 80. The strut and the shock absorber 20 are provided with an upper spring seat 51 and a lower spring seat 52, respectively, and a coil spring 50 is installed thereon. A dust cover 60 is installed within the coil spring 50 to prevent the contaminants from infiltrating between the strut 10 and the shock absorber. Strut mount 100, according to a preferred embodiment, is positioned on an upper portion of a shock absorber 20 and built into a strut 10. The periphery of the strut mount 100 is preferably fixed to vehicle frame 40, and a bracket 102 is coupled to an inner upper end of the strut mount 100 to hermetically seal the strut mount. The strut mount 100 is provided in an inner lower end thereof with a resilient mounting rubber 104.

A chamber is formed on the mounting rubber 104 in the strut mount 100, and is divided into an upper chamber 112 and a lower chamber 113 by a decoupler 111 of a plate structure. The lower chamber 113 is filled with a fluid S therein. The decoupler 111 is formed with an orifice 114 penetrating the decoupler, in order to guide the fluid S in the lower chamber 113 to the upper chamber 112. Preferably, the fluid comprises water or oil having a desired viscosity as may be selected by a person of ordinary skill based on a particular application.

The strut mount assembly of the present invention also preferably includes a plunger 120 located on the upper end of a piston rod 22. The piston rod penetrates an upper spring sheet 51. The plunger 120 is coupled to the piston rod 22 via a fastening member 122, and is positioned within the lower chamber 113. A threaded structure or press-fitted structure may be used as the fastening member 122.

Figure 2:
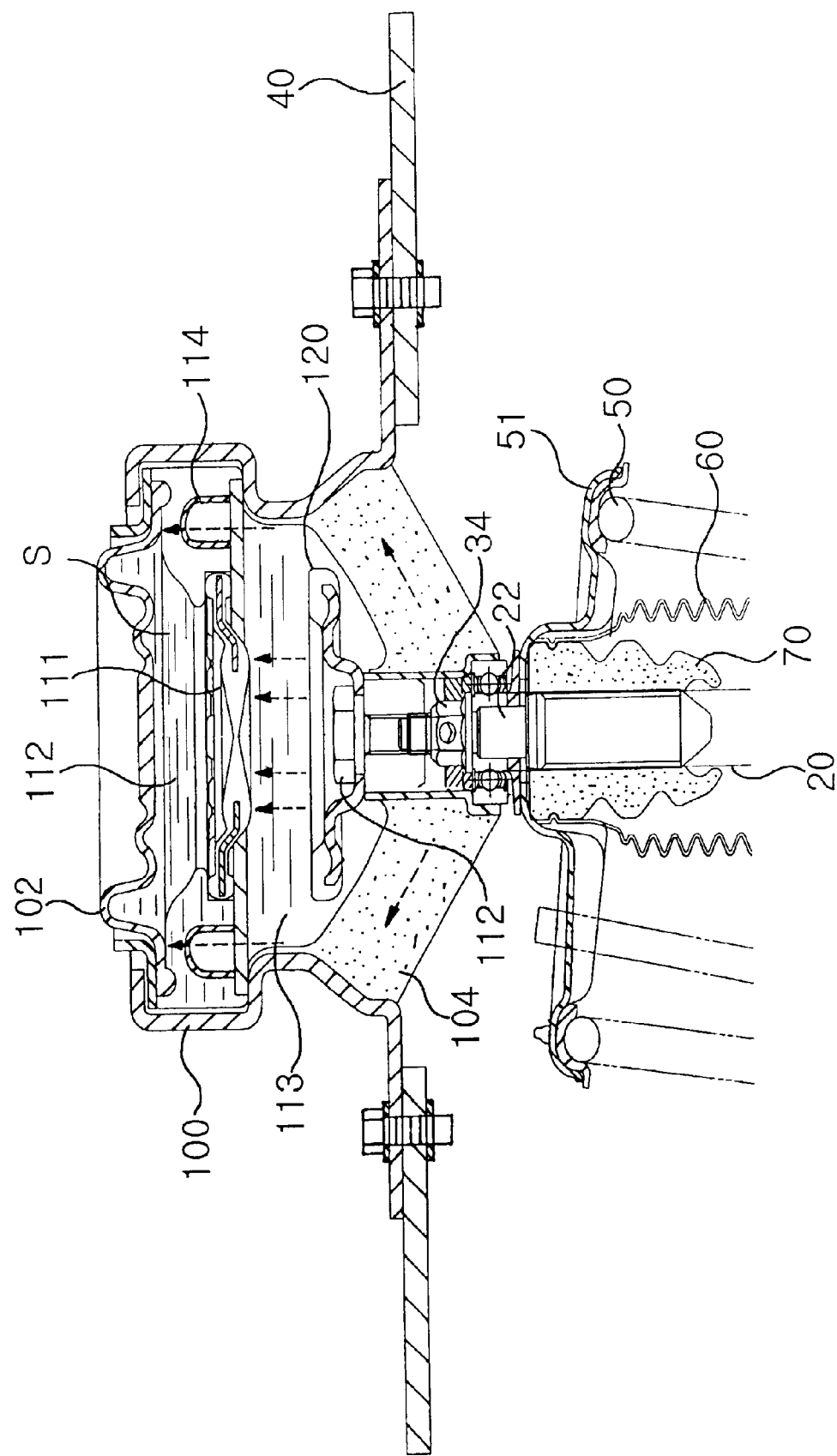
FIG. 2 is a cross sectional view illustrating the operating state of the hydraulic strut mount assembly in FIG. 1.

With the construction of the hydraulic strut mount assembly of the present invention as described above, upon collision or rebound, the vibration conveyed through the coil spring 50 is transferred to the shock absorber 20, and the piston rod 22 is reciprocally moved up and down. A portion of the vibration is absorbed by the shock absorber 20, and simultaneously, is dispersed to the vehicle frame 40 with deformation of the mounting rubber 104 provided on the inner lower end of the strut mount 100, as shown in FIG. 2.

Upon up and down reciprocation of the piston rod 22, the plunger 120 moves up and down in line with the operation of the piston rod, so that the plunger 120 pressurizes upward the fluid within the lower chamber 113. The fluid S, pressurized by the plunger 120, flows into the upper chamber 112 through the orifice 114. In the process, the vibration is absorbed by the hydraulic pressure.

According to the hydraulic strut mount assembly of the present invention, flow of fluid may occur when the amplitude of vibration transferred from the steering knuckle 80 is above a predetermined level. Thus, kinetic energy of the fluid S is converted to heat energy, thereby carrying out the vibration damping function. In an alternative embodiment of the present invention, if the vibration happens at an amplitude below a predetermined level, preferably, in a range of ±0.5 to ±1.0 mm, the pumping action of the mounting rubber 104 is not significant, and amplitude of the plunger 120 is minute. Therefore, minute vibration occurs in the decoupler 111, but the fluid S does not flow from the lower chamber 113 to the upper chamber 112.

In addition, if weak vibration is transferred from the steering knuckle 80, the plunger 120 restricts the flow of the fluid S to generate eddies in the fluid S, thereby achieving the proper high frequency damping function. If the high frequency vibration exceeds an amplitude range of ±1.0 mm, the plunger 120 reciprocally moves up and down, so that the fluid S flows from the lower chamber 113 through the orifice 114 to the upper chamber 112. The vibration damping effect relative to the vehicle body may be maximized by the hydraulic pressure generated at the above process.

With the above construction of the hydraulic strut mount assembly of the present invention, a plurality of chambers are formed within the strut mount, in which the chambers are communicated with each other and are filled with the hydraulic fluid for supplying a hydraulic pressure to one side of the chamber. The hydraulic pressure generated upon occurrence of strong vibration above a predetermined level reinforces the damping capability of the shock absorber and coil spring, thereby improving the ride quality of the vehicle.

The forgoing embodiment is merely exemplary and is not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A hydraulic strut mounting assembly, comprising:

a strut mount coupled to a shock absorber;

a decoupler provided across an interior space of the strut mount;

upper and lower chambers formed in the strut mount by the decoupler and adapted to contain a hydraulic fluid;

an orifice communicating the upper chamber with the lower chamber; and a plunger mounted on the shock absorber to pressurize fluid in the lower chamber when a vibration is generated.

2. The hydraulic strut mounting assembly as claimed in claim 1, wherein the strut mount includes a bracket detachably coupled to an upper portion thereof for isolating an interior of the strut mount from the exterior, and a mounting rubber provided in a lower portion thereof for absorbing and dispersing vibration and the strut mount is hermetically sealed by the bracket and mounting rubber.

3. The hydraulic strut mounting assembly as claimed in claim 1, wherein the plunger is coupled to the shock absorber via fastener.

4. The hydraulic strut mounting assembly as claimed in claim 1, wherein the plunger is positioned in the lower chamber.

5. The hydraulic strut mounting assembly as claimed in claim 1, wherein the fluid flows from the lower chamber to the upper chamber by the plunger in response to vibration exceeding an amplitude range of 1.0 mm.

6. A hydraulic strut mounting assembly, comprising:

a strut mount defining a space adapted to contain hydraulic fluid;

a decoupler dividing said space into an upper chamber and a lower chamber and controlling flow of hydraulic fluid between said chambers; and a plunger moveably disposed within the lower chamber and mounted on a shock absorber component extending into said lower chamber.

7. The hydraulic strut mounting assembly of claim 6, further comprising a resilient material surrounding and supporting the shock absorber to further define the lower chamber.

8. The hydraulic strut mounting assembly of claim 6, wherein the decoupler comprises a plate structure defining at least one orifice for the passage of hydraulic fluid therethrough.

\* \* \* \* \*